May 16, 1950        W. H. KNAPP        2,507,980
INDEPENDENT WHEEL SUSPENSION
Filed Aug. 18, 1947
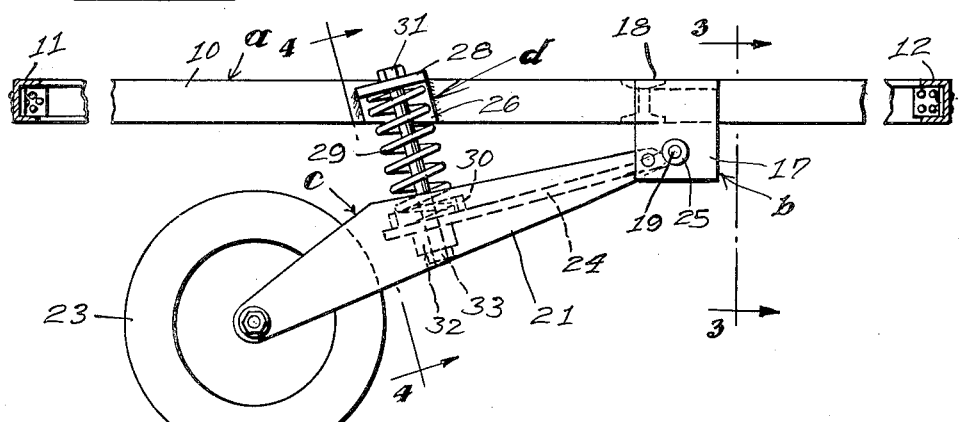
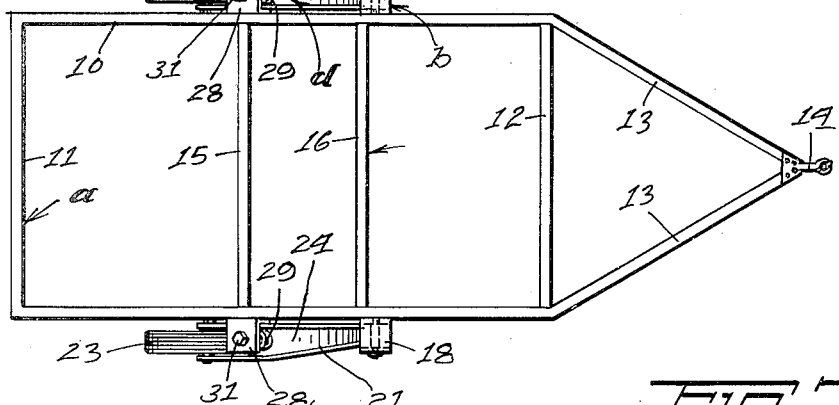
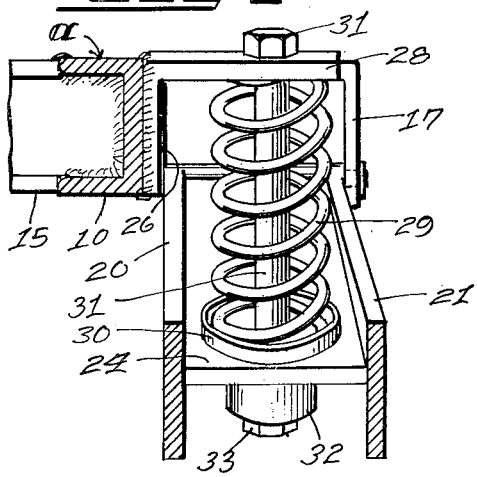
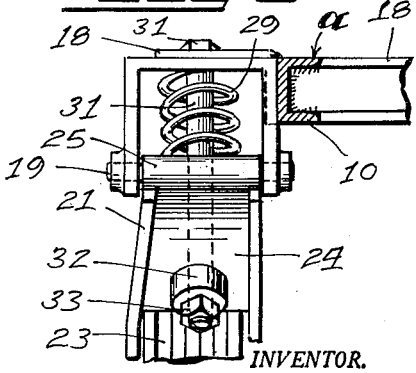
INVENTOR.
Walter H. Knapp
BY
Wilfred Lawson
Attorney Patented May 16, 1950

2,507,980

UNITED STATES PATENT OFFICE 2,507,980

INDEPENDENT WHEEL SUSPENSION

Walter H. Knapp, Newport Beach, Calif.

Application August 18, 1947, Serial No. 769,218

1 Claim. (Cl. 280—124)

My invention relates to trailers adapted to be removably attached to power driven vehicles and more particularly to two wheeled, light weight trailers.

The object of my invention is to provide a trailer of the character indicated, the entire frame of which is constructed of channel irons, and the wheels of which are rotatably arranged in wheel hangers pivotally secured to the trailer frame.

Another object of my invention is to provide a trailer of the character indicated above the pivotal movement of the wheel hangers of which is limited in upward and downward direction by resilient means.

Other objects of my invention not specifically mentioned may appear in the following specification describing my invention with reference to the accompanying drawing illustrating a preferred embodiment of my invention.

It is, however, to be understood, that my invention is not to be limited or restricted to the exact construction and combination of parts described in the specification and shown in the drawing, but that such changes and modifications can be made, which fall within the scope of the claim appended hereto.

In the several figures of the drawing similar parts are indicated by similar index characters and Figure 1 is an elevational side view of a trailer according to my invention.

Figure 2 is a top plan view of Figure 1.

Figure 3 is a sectional view taken on line 3—3 in Figure 1, and

Figure 4 is a sectional view taken on line 4—4 in Figure 1.

The trailer forming the subject matter of my invention comprises a frame $a$ having two side members 10 extending parallel to each other. A rear transverse member 11 is secured to and connects the rear ends of the two side members 10, and a front transverse member 12 extends between and is fastened to the front ends of the side members 10.

From the two front ends of said side members two hitch members 13 extend forwardly and inwardly toward each other and support on their front ends a hitch 14 of conventional form and construction adapted to be removably attached to a power driven vehicle.

Two intermediate transverse members 15 and 16 are arranged at equal distances from the transverse center line of the rectangular body formed by the two side members 10 and the front and rear transverse members 12 and 11 respectively, and are secured to the side members.

All frame members and the hitch members are preferably made from channel iron.

On the outside of each side member 10 of the frame $a$, a frame hanger $b$ is fastened oppositely of the forward intermediate transverse member 16. Each frame hanger has the shape of an inverted U and has two downwardly extending flanges 17 and a horizontally arranged web 18. The upper surface of the latter is located in the same horizontal plan as the top surface of the side member 10 and the rear end of each frame hanger $b$ is arranged approximately in the same vertical plan as the rear edge of the forward intermediate transverse member 16. The flanges 17 of the frame hangers $b$ extend beyond the bottom surface of the side members 10.

Each frame hanger $b$ supports a wheel hanger $c$ pivotally on a pivot pin 19 extending through and secured in its two flanges 17 adjacent to the lower rear corners thereof.

Each wheel hanger $c$ is preferably made from sheet metal and has a straight inside plate 20 and an outside plate 21, the rear portion of which extends parallel to the inside plate.

Between each pair of end portions of these plates a roller bearing 22 or the like is arranged and is secured thereto, and each bearing 22 supports a wheel 23 of any well known and preferred construction.

The straight rear portion of each outside plate 21, extends forwardly as far as the foremost part of the tire of the wheel 23 and extends then inwardly at an obtuse angle. The front and rear edges of the plates 20 and 21 are formed arcuately transversely of said plates, and a transverse plate 24 is located between the front portions of the inside and outside plates and is welded onto these plates, the rounded front edges of which do not quite reach to the rear end of the corresponding frame hanger $b$.

On the front end of each transverse plate 24, a bushing or sleeve 25 is formed adapted to receive the pivot pin 19 pivotally therein and to extend between the flanges 17 of the frame hanger $b$.

The reference $d$ designates a rear frame hanger which is welded onto the outside of each side member 10 above the rear end of the corresponding transverse plate 24 and substantially in line with the end of the rear intermediate transverse member 15. Each rear frame hanger $d$ has a side flange 26 secured to the member 10 and an outwardly projecting flange 28.

A helical spring 29 is arranged between each rear frame hanger $d$ and the corresponding transverse plate 24. The upper end of the helical spring is located against the under side of the flange 28 of the rear frame hanger $d$ and the lower end of each helical spring 29 is arranged inside an annular shoulder 30 formed or secured on the transverse plate 24.

A guide bolt 31 extends through the flange 28 of each rear frame hanger $d$, through the helical spring 29, the transverse plate 24 and through a rubber rebound cushion 32 located underneath each transverse plate 24.

A nut 33 on each bolt 31 serves the purpose of adjusting the pressure of the helical springs 29.

Attention is called to the fact that the rear frame hangers $d$ are located on the side frame members 10, so that they coincide with the rear intermediate transverse frame member 15.

The arrangement of the two intermediate transverse members 15 and 16 in relation to the frame hangers $d$ and $c$ enables these transverse members to serve as ties between the corresponding frame hangers on the two sides of the frame $a$ and reinforce the suspending structure of the trailer according to my invention.

Having described by invention I claim as new and desire to secure by Letters Patent:

In a wheel mounting for trailers and the like, including a substantially rectangular frame, an inverted U-shaped bracket secured on each side of said frame, an arm of H-channel form pivoted at one end between the legs of each of said brackets and having a portion of its cross web cut away at its other end to form a fork to receive a wheel within the same, an axle carried adjacent the free ends of the fork for said wheel, a second bracket of inverted L-form secured on said frame in spaced relation with respect to the first bracket, a bolt depending from said second bracket and through the cross web of said arm, and a coil spring encircling said bolt between said second bracket and said cross web.

WALTER H. KNAPP.

REFERENCES CITED

The following references are of record in the file of this patent:

UNITED STATES PATENTS

| Number | Name | Date |
|---|---|---|
| 904,270 | Lippy | Nov. 17, 1908 |
| 2,077,710 | Pribil | Apr. 20, 1937 |
| 2,219,401 | Sampsell | Oct. 29, 1940 |
| 2,227,875 | Boden | Jan. 7, 1941 |